J. H. SPELMAN.

Churn.

No. 69,855.

Patented Oct. 15, 1867.

WITNESSES:
E. E. Waite
F. Alden.

INVENTOR:
J. H. Spelman,

United States Patent Office.

J. H. SPELMAN, OF BAZETTA, OHIO.

Letters Patent No. 69,855, dated October 15, 1867.

---

IMPROVEMENT IN CHURNS.

---

The Schedule referred to in these Letters Patent and making part of the same.

---

TO ALL WHOM IT MAY CONCERN:

Be it known that I, J. H. SPELMAN, of Bazetta, in the county of Trumbull, and State of Ohio, have invented certain new and useful Improvements in Churns; and I do hereby declare that the following is a full and complete description of the same, reference being had to the accompanying drawings, making a part of this specification, in which—

Figure 1:
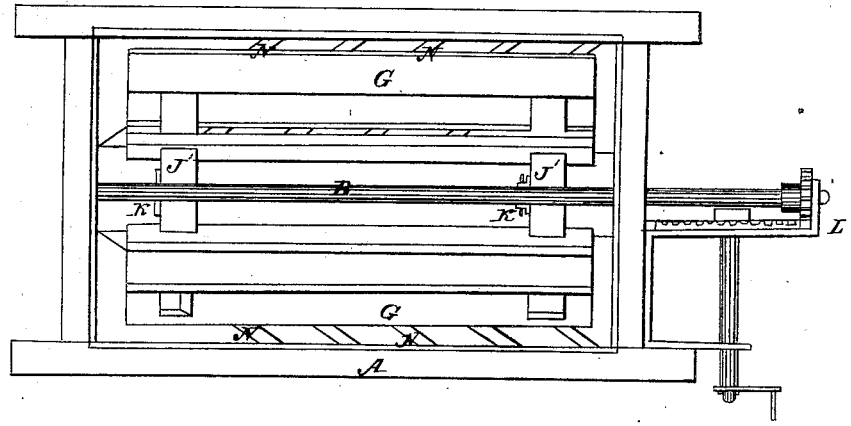

Figure 1 is an inside view of the churn.

Figure 2:
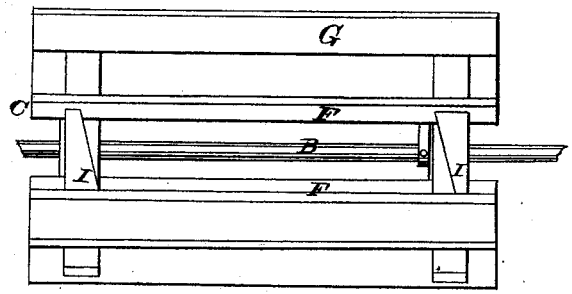

Figure 2, a side view of the beaters.

Figure 3:
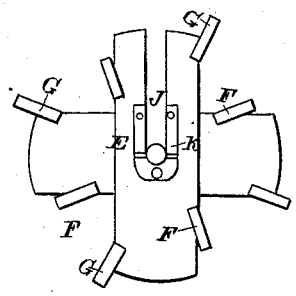

Figure 3, an end view of the same.

Like letters of reference refer to like parts in the several views presented.

The body of this churn consists of an oblong square box or case, A, fig. 1, the size of which being according to capacity of the churn required. Through the centre of this box is projected a shaft, B, on which is placed a revolving beater or dasher, C, consisting of a pair of heads, E, fig. 3, secured at each end of the shaft, as shown in the drawing. On the arms of these heads, and reaching from one head to the other, are secured the beaters F, in the order as shown in fig. 3, in which it will be seen that the dashers are placed on each side of the arms comprising the heads, so that each alternate one, G, may extend out beyond the arm, whereas the other, F, on the opposite side, does not reach quite to the end; hence the two series of beaters constituting the dasher, when revolving, describe unequal circles one within the other. It will be observed that the arms I, fig. 2, are made slanting and reversely from each other, the purpose of which will hereafter be shown. J, fig. 3, is a slot, cut down in each arm J' to the centre, through which the dasher is slipped, on to the shaft, and secured to the same by pins K.

This churn is operated by the cog-wheel and pinion L, arranged on the end of the box, as shown in fig. 1, and as it is made to revolve it dashes the cream in among the beaters, the inner range H disturbing the cream near the centre, and the outer range G disturbing it on the outer side. At the same time, by the slanting direction given to the sides of the arms I, the cream is thrown from the ends toward the middle, by which, together with the action of the grooves N, cut in the bottom of the churn, it is most thoroughly agitated and broken up, whereby the butter is easily and quickly brought. The slanting direction given to the sides of the arms I, referred to, being reversed on each alternate arm, the effect of throwing the cream toward the middle of the churn will be the same in either way that the dasher may be made to revolve; hence the churn will operate equally well when turned in either direction.

What I claim as my invention, and desire to secure by Letters Patent, is—

The special construction of the dasher C, with slanting arms I and beaters G F, when arranged so as to describe unequal circles one within the other, in combination with the case A, in the manner as and for the purpose set forth.

J. H. SPELMAN.

Witnesses:
W. H. BURRIDGE,
FRANK S. ALDEN.